United States Patent

[11] 3,525,375

| [72] | Inventors | Robert Albert Heising<br>Bloomfield, Iowa;<br>John Joseph Hennen, Ottumwa, Iowa |
|---|---|---|
| [21] | Appl. No. | 751,947 |
| [22] | Filed | Aug. 12, 1968 |
| [45] | Patented | Aug. 25, 1970 |
| [73] | Assignee | Deere & Company<br>Moline, Illinois<br>a corporation of Delaware |

[54] FORAGE HARVESTER RECUTTER SCREEN
8 Claims, 4 Drawing Figs.

[52] U.S. Cl. .................................................... 146/117,
146/107, 241/90
[51] Int. Cl. ........................................................ A01d 55/18
[50] Field of Search ........................................... 146/117,
120, 107T; 241/90, 89; 56/16

[56] References Cited
UNITED STATES PATENTS

| 2,616,433 | 11/1952 | Anderson .................... | 241/89X |
| 3,040,794 | 6/1962 | Jacobsen et al. ............. | 146/107(T)UX |
| 3,357,164 | 12/1967 | Hennen ....................... | 56/16 |

*Primary Examiner* — Andrew R. Juhasz
*Assistant Examiner* — Z. R. Bilinsky
*Attorney* — H. Vincent Harsha, Harold M. Knoth, William A. Murray and John M. Nolan ABSTRACT: A pull-type forage harvester has an axially transverse rotary reel-type cutterhead with helical knives which register with a shear bar at the front of the cutterhead housing to reduce the crop being fed rearwardly into the housing over the shear bar. A removable arcuate screen is placed over the rearwardly and downwardly directed discharge opening closely adjacent to the cutterhead and has a number of elongated diagonal slots canted relative to the cutterhead knives. The rotating knives force the crop through the slots to further reduce it and a transverse auger collects the crop forced through the screen and delivers it to a blower-type discharge elevator.

INVENTORS
R. A. HEISING
J. J. HENNEN 3,525,375

FORAGE HARVESTER RECUTTER SCREEN

BACKGROUND OF THE INVENTION

This invention relates to forage harvesters and more particularly to a removable recutter screen mounted over the discharge opening of the cutterhead housing adjacent to the reel-type cutterhead to further reduce the crop before it is discharged.

Recutter screens for forage harvesters with cylinder-type cutterheads have been used to a considerable extent, since the use of such screens provides a finer cut of the crop material, making the crop more palatable to the livestock and easier to feed and store. Generally, in the past, such screens have been provided with a relatively large number of closely spaced round apertures through which the cutterhead will force the crop, although it has been known to utilize square apertures in the recutter screen. Of course, the length of cut varies according to the size of the apertures, and generally alternate screens with different size apertures are available, so that the operator may utilize the screen which best suits the crop conditions and the fineness of cut which he desires.

The use of such screens consumes additional power and their use has generally been restricted to forage harvesters wherein additional means other than the cutterhead are utilized to discharge the crop into the accompanying collector vehicle, although it is known to provide a slotted grate for a cut-and-throw-type forage harvester, wherein the cylinder-type cutterhead also impels the reduced crop into the collector vehicle. However, the slots in such a grate extend perpendicular to the cutterhead knives, so that the grate does not interfere with the tangential discharge of the crop to a degree which would require auxiliary discharge means, and therefore the use of such a grate provides additional reduction of the crop only to a limited degree.

As previously mentioned, the use of either the round or square holed recutter screens has resulted in a considerable consumption of power. This is further complicated by the fact that in many crops, the crop material tends to hairpin around the rear edge of each aperture, and the resulting buildup of material inside the screen reduces the efficiency of the screen and further increases the power consumption. The hairpinning can be reduced by providing a very small clearance between the cutterhead and the recutter screen, although in prior machines, the optimum clearance has been difficult to maintain since the effective diameter of the cutterhead is frequently changed by grinding the knives.

SUMMARY OF THE INVENTION

According to the present invention, an improved recutter screen is provided for such forage harvesters with cylinder-type cutterheads and auxiliary crop discharge means, the improved recutter screen eliminating the buildup of material inside the screen and reducing the power consumption of the harvester for a given fineness of cut. More specifically, the recutter screen is provided with elongated apertures which extend diagonally relative to the cutterhead knives so that the elongated edges of the apertures shear the crop material passing through the apertures and relatively few rear edges or strip points, at which the crop material can build up, are provided.

Another feature of the invention resides in the provision of means for adjusting the screen so that the desired amount of clearance between the critical area of the screen and the cutterhead is maintained, regardless of changes in the effective diameter of the cutterhead as a result of grinding and adjustment of the knives.

Still another feature of the invention resides in the provision of only a single row of said elongated apertures so that the strip points for the apertures are all adjacent the rearward end of the screen, which can be easily adjusted to maintain the proper clearance with the cutterhead.

DESCRIPTION OF THE PREFERRED EMBODIMENT

Figure 1:
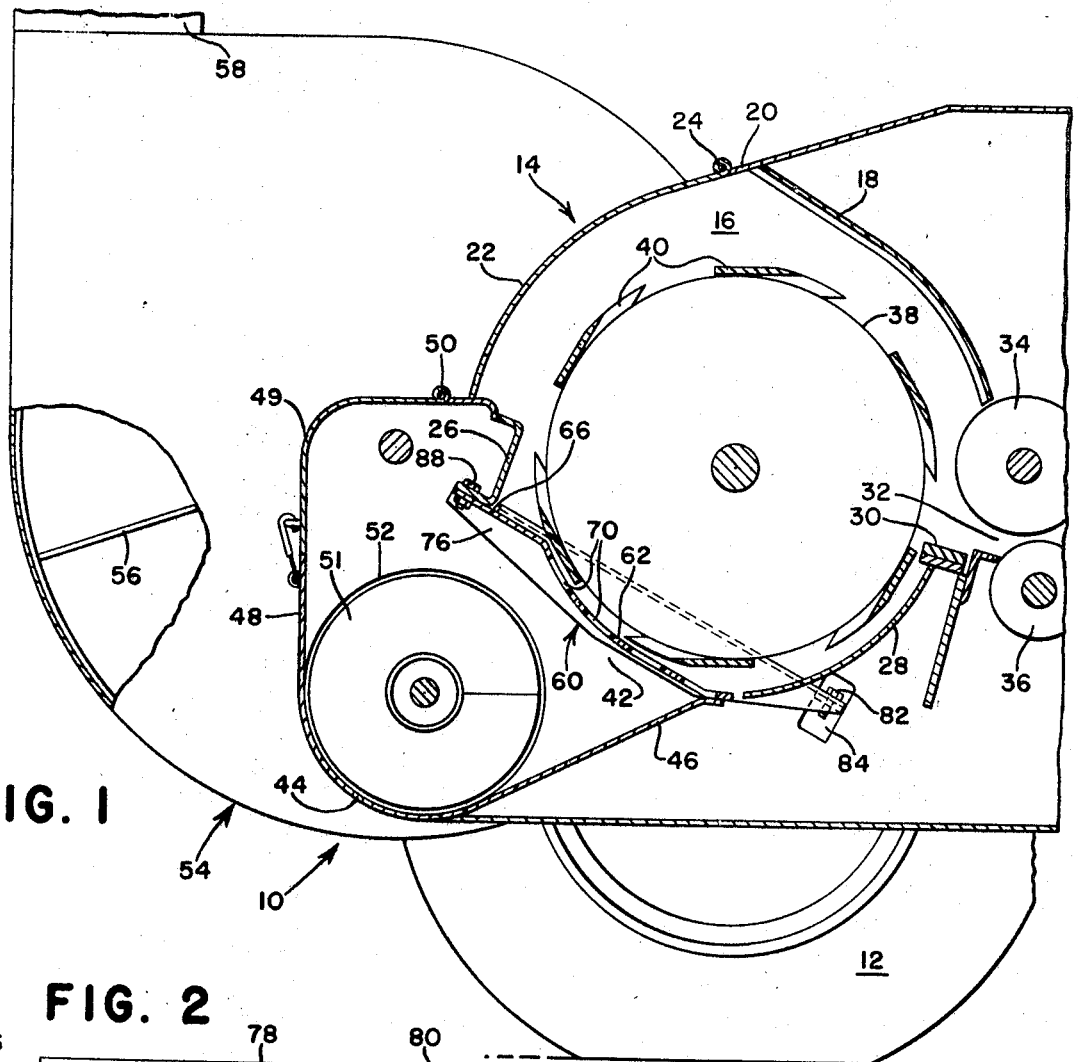
FIG. 1 is a fore-and-aft vertical section of the rearward portion of a forage harvester showing the recutter screen mounted in the cutterhead housing, the section being viewed slightly to the left of the fore-and-aft center line of the cutterhead.
Figure 2:
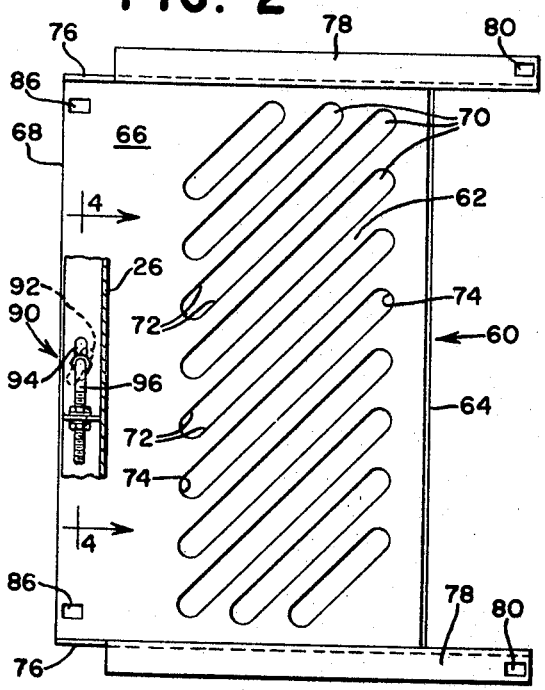
FIG. 2 is a plan view of the recutter screen on a slightly larger scale than shown in FIG. 1, and including the screen adjusting mechanism.
Figure 3:
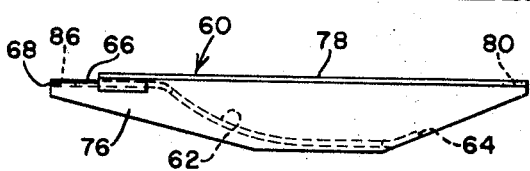
FIG. 3 is a side elevation view of the recutter screen.
Figure 4:
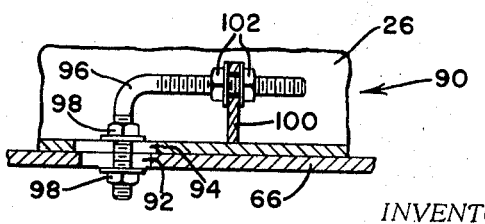
FIG. 4 is an enlarged section viewed along the line 4—4 of FIG. 2.

The invention is embodied in a forage harvester having a mobile main body, indicated generally by the numeral 10, only the rearward portion of which is shown in FIG. 1. The forage harvester is of the same general construction as shown in the assignee's U.S. Pat. 3,377,785 issued Apr. 16, 1968 and is mounted on a pair of support wheels 12, only the left-hand wheel of which is shown in FIG. 1, the machine advancing toward the right in FIG. 1.

The forage harvester includes a cutterhead housing, indicated generally by the numeral 14, at the right side of the machine. The cutterhead housing 14 is formed by a pair of opposite upright side walls 16, only the left-hand side wall 16 being shown in FIG. 1 since it is a section view, the right-hand side wall being similar to the illustrated side wall 16. The front of the cutterhead housing is formed by a front shield member 18 which extends between the opposite sides 16 and depends from a top portion 20 of the housing, which also spans the width of the housing. The rearward part of the top 20 forms a cutterhead access door 22, which is swingable upwardly about a transverse pivot 24 adjacent the upper edge of the front shield 18 and provides access to the housing interior.

A channel-shaped rear member 26 spans the width of the housing immediately below the lower rear edge of the door 22 and faces in a generally upwardly and rearwardly direction. The lower forward portion of the housing is formed by an arcuate band 28 which faces upwardly and rearwardly and spans the width of the housing forwardly and downwardly of the rear member 26 and below the front shield member 18. A transverse shear bar 30 also spans the width of the housing adjacent the top edge of the housing band 28 and is spaced below the lower edge of the front shield member 18, said space forming an inlet opening 32.

As the machine advances, the crops are removed from the field by conventional harvesting means (not shown) and fed rearwardly through the inlet opening 32 and over the shear bar 30 by a conventional feed mechanism, which includes a pair of feed rolls 34 and 36. As the crop moves over the shear bar 30, it is chopped by a rotating reel or cylinder-type cutterhead 38, which is mounted within the cutterhead housing 14 and rotates about a transverse axis. The cutterhead is somewhat schematically illustrated and includes six generally longitudinally extending knives 40, which are mounted at the cutterhead periphery and generate a cylinder as the cutterhead rotates, the shear bar being disposed closely adjacent to the cutterhead periphery so that the knives cooperate with the shear bar to reduce the crop fed into the cutterhead. Preferably, the knives are of the helical type, and, in the illustrated embodiment, they form an approximate 18° angle relative to the axis of the cutterhead. The cutterhead rotates in a clockwise direction, so that the crop material chopped at the shear bar is impelled downwardly and rearwardly through a cutterhead housing outlet opening 42, which spans the width of the housing and is formed by the space between the rearward edge of the cutterhead housing band 28 and the lower edge of the member 26.

The crop dropping through the outlet opening 42 is collected in a transversely extending auger trough 44, which includes an upwardly and forwardly extending front wall 46 that merges with the rearward end of the cutterhead housing band 28, and an upright rear wall 48, the upper portion of which is provided with an access door 49, which spans the width of the cutterhead housing and covers the auger trough 44. The door 49 swings upwardly and rearwardly about a transverse pivot 50 adjacent the rearward edge of the cutterhead access door 22 and provides access to the auger trough and the outlet opening 42.

A transverse auger 51 is mounted in the auger trough 44 and substantially extends the width of the machine, the auger 51 collecting the crop falling into the trough 44 through the outlet opening 42 and moving it laterally to the inlet 52 of a blower-type elevator 54, mounted on the left-hand side of the machine. The blower-type elevator 54 is of conventional construction and includes a vane-type impeller 56 which engages the crop moving through the inlet 52 and discharges it tangentially upwardly and rearwardly through a discharge spout 58, which directs the crop into the collecting vehicle.

Removably mounted over the discharge opening 42 between the cutterhead 38 and the auger 51 is a recutter screen 60. The screen 60 includes an arcuate or concave portion 62, which has substantially the same radius of curvature as the cutterhead periphery and spans the width of the discharge opening closely adjacent to the cutterhead periphery and generally coaxial therewith. The arcuate portion 62 has a transverse front edge 64 approximately directly below the axis of the cutterhead, the rearward end of the arcuate portion merging with a relatively flat upwardly and rearwardly extending rear portion 66, the rearward edge 68 of which underlies the bottom of the channel-shaped rear member 26.

The arcuate portion of the screen has a plurality of elongated apertures or slots 70, which extend in a diagonal direction relative to the cutterhead axis at approximately a 45° angle relative thereto. The slots 70 have parallel diagonally extending opposite side edges 72 and rounded opposite ends 74. The slots 70 are parallel and are disposed in a side-by-side, relatively closely spaced relationship in a single row across the width of the screen. Except for the two slots at each end of the screen, the slots 70 are identical and have their front and rear ends 74 in transverse alignment, the slots at the opposite ends of the screen being necessarily foreshortened since the slots extend in a diagonal direction although the forward end of the two right-hand slots are aligned with the forward ends of the other slots while the rearward end of the two left-hand slots are aligned with the rearward end of the other slots. Substantially the entire area of the arcuate portion 62 of the screen is slotted, and, since the screen covers the entire discharge opening 42, the material moving from the cutterhead to the discharge auger 51 must necessarily pass through the screen slots 70.

The screen 60 also includes opposite upright side panels 76, which are secured to the opposite ends of the arcuate screen portion 62. The side panels 76 have horizontal outwardly extending top members 78 with vertical holes 80 at their forward ends. The holes 80 are somewhat elongated in a fore-and-aft direction and the forward end of the screen is connected to the forage harvester body by means of a pair of bolts 82 extending through the holes 80 and threaded into brackets 84 secured to the opposite sides of the cutterhead housing below the cutterhead housing band 28. Since the holes 80 are elongated in a fore-and-aft direction, they permit a small degree of fore-and-aft adjustment of the front end of the screen, the bolts 82 being tightened to firmly secure the front end of the screen in the selected position. As best seen in FIG. 1, the rearward end of the housing band 28 is adjacent to the screen's front edge 64. A pair of holes 86 are also provided in the rear portion 66 of the screen adjacent the opposite sides of the screen at the rearward edge 68 and are slightly elongated in a fore-and-aft direction like the holes 80. A pair of fasteners 88 releasably clamp the rear portion 66 to the underside of the transverse member 26, the fasteners 88 being in the form of bolts extending through the holes 86 and corresponding holes in the member 26 and having associated nuts, which can be tightened, to clamp the screen to the member 26, or loosened, to permit a small degree of fore-and-aft adjustment of the screen.

The fore-and-aft adjustment of the screen is accomplished by means of an adjusting mechanism, indicated in its entirety by the numeral 90. The mechanism 90 includes an angled slot 92 in the screen adjacent the rearward edge and a similar transverse slot 94 in the lower flange of the channel-type rear member 26. The two slots intersect and form an opening through the screen and the member 26 at their point of intersection. One leg of an L-shaped bolt 96, which is threaded at both ends, extends through the opening formed by the intersecting slots 92 and 94 is releasably clamped therein by a pair of nuts 98 threaded on said leg of the bolt 96 on opposite sides of the screen and rear member. The other leg of the bolt 96 extends in a transverse direction on top of the lower flange of the channel-shaped member 26 and extends through an apertured bracket 100 attached to the member 26. A pair of nuts 102 are threaded on the threaded portion of the laterally extending leg of the bolt on opposite sides of the bracket 100, so that by loosening one nut 102 and tightening the other, the bolt 96 can be shifted laterally, thereby shifting the screen in a fore-and-aft direction.

In operation, if a relatively coarse cut of crop material is desired, the screen can be removed by removing the bolts 82 and 88 and the lower nut 98, permitting the screen to drop off the member 26 so that it can be removed through the access door 49. When a finer cut of material is desired, the screen can be installed by following the reverse of the above procedure. The length of the cut is determined by the width of the slot 70 and preferably, alternate screens with different sized slots can be provided to vary the length of cut. For example, it is contemplated that screens with slot widths between three-eighths inch and three inches could be provided for alternate installation, so that the forage harvester can be utilized to provide a wide variety of cuts to fit the particular crop, crop condition or desire of the operator. In the illustrated embodiment, the slots 70 are approximately one inch wide and provide a medium length of cut.

The screen is preferably adjusted so that there is a decreasing clearance between the screen and the cutterhead in the direction of cutterhead rotation. For example, in the illustrated embodiment, the screen is adjusted to provide approximately one thirty-second inch clearance between the screen and cutterhead at the rearward end of the slots while approximately one-eighth inch clearance is provided at the central area of the slots and approximately one inch clearance is provided at the front edge 64 of the screen.

The adjustment of the screen is accomplished by loosening the bolts 82 and the fasteners 88 to permit fore-and-aft adjustment of the screen within the limits established by the fore-and-aft elongated holes 80 and 86. The lower nut 98 on the bolt 96 is also loosened to unclamp the screen from the member 26 at the adjusting mechanism 90. Adjustment is then achieved by threading both nuts 102 on the horizontal leg of the L-bolt 96 in the same direction to laterally shift the L-bolt, which causes the vertical leg of the L-bolt to slide along the slot 94 in the fixed channel-shaped member 26. The shifting of the vertical leg of the L-bolt also moves the L-bolt along the angled slot 92 in the screen, thereby causing the screen to shift forwardly or rearwardly according to the direction of shifting of the L-bolt, since the screen is limited to fore-and-aft shifting only.

As previously described, the crop is initially reduced as it is fed over the shear bar into the cutterhead 38 and the partially reduced crop is impelled in a clockwise direction toward the screen 60. When a crop reaches the screen, it is moved rearwardly along the screen and forced through the slots 70, to be further reduced thereby. As the crop moves rearwardly, the opposite edges 72 of the slots function as shear edges. Although the knives 40 are preferably helical-type knives with edges angled at approximately 18° relative to the cutterhead axis, the slots 70 are angled at approximately 45°, so that knives still form a 63° angle with the shear edges 72. Of course, if the edges 72 were normal to the knife edges, the edges 72 would perform little shear action, and if they were parallel to the knife edges, there would be intermittent impact as each knife passed each edge 72. Thus, although the 45° angle at which the slots are canted is not critical, it is necessary that the slot edges form a substantial angle with the knife edges and further necessary that the angle be substantially less than 90°.

As the crop material moves rearwardly along the slots 70, it is contemplated that much of the crop will be sufficiently reduced to fall through the recutter screen. The rearward end 74 of each slot functions as a strip point at which the material is either sufficiently reduced to go through the slots or carried over the cutterhead. It is at this rearward strip point where a relatively close clearance between the cutterhead and the screen is desired, since a larger clearance permits hairpinning of the crop and a consequent crop buildup at the end of the slots. The previously described adjustment of the screen permits easy maintenance of the optimum clearance at this point, so that, when the knives are ground and sharpened on the cutterhead, which is frequently necessary, a corresponding adjustment can be made of the screen through the access door 49. Of course, when the screen is shifted forwardly to compensate for the reduced effective diameter of the cutterhead as a result of grinding, the clearance between the forward end of the screen and the cutterhead is slightly increased. However, this does not affect the efficiency of the screen, since the clearance at the forward end of the screen is relatively immaterial. In fact, the reducing clearance rearwardly between the cutterhead and screen prevents a buildup of material at the forward end of the screen. As is apparent from the drawings, the illustrated screen has only eight strip points at the rearward end of the slots, and the clearance at said points is sufficiently small to prevent a buildup of material, as opposed to conventional screens with a multitude of round or square holes, wherein the rearward end of each hole functions as a strip point, making it difficult to maintain the proper clearance at each hole, and further making it impossible to maintain the optimum clearance at each hole if the screen clearance decreases from front to rear.

We claim:

1. In a forage harvester having a mobile main frame, a cutterhead housing mounted on the frame and having a crop inlet opening and a discharge opening, and a rotary reel-type cutterhead mounted in the housing and having a plurality of knives with parallel cutting edges which generate a cylinder at the cutterhead periphery as the cutterhead rotates to reduce the crop moving through the inlet, and means adapted to collect the reduced crop moving through the discharge opening and discharge it from the harvester, the improvement comprising: a generally arcuate recutter screen having a plurality of elongated slot-like apertures with elongated generally parallel opposite sides extending diagonally relative to the axial length of the screen, the apertures being disposed side-by-side in a single row substantially spanning the axial length of the screen; and means mounting the screen over the discharge opening closely adjacent to the cutterhead periphery and generally coaxial therewith, with the elongated edges of the apertures extending diagonally relative to the cutterhead knife cutting edges, the crop being impelled through the apertures by the cutterhead to the crop collecting and discharge means.

2. The invention defined in claim 1 wherein the apertures have rounded ends.

3. The invention defined in claim 1 wherein the edges of the apertures are canted between 30° and 60° relative to the axis of the cutterhead.

4. The invention defined in claim 1 wherein the knives are of the helical type, the knife edges being canted relative to the axis of the cutterhead, and the edges of the screen apertures are canted at more than a 45° angle and less than a 75° angle relative to the knife edges.

5. The invention defined in claim 4 wherein the screen is substantially axially coextensive with the cutterhead and the screen apertures are disposed in a side-by-side relationship in a single row substantially spanning the width of the screen.

6. The invention defined in claim 1 wherein the cutterhead rotates about a transverse axis and the recutter screen is disposed downwardly and rearwardly thereof, and the screen mounting means includes adjusting means for varying the clearance between the screen and the cutterhead periphery.

7. The invention defined in claim 6 wherein the adjusting means includes slot means at the opposite ends of the screen and releasable fastener means extending through the slot means and adapted to secure the screen to the housing when tightened and permit fore-and-aft adjustment of the screen in a generally tangential direction relative to the cutterhead axis when released.

8. The invention defined in claim 6 wherein the screen is mounted at the cutterhead periphery with a decreasing clearance between the cutterhead periphery and the screen apertures in the direction of cutterhead rotation.